March 21, 1961     M. KORACH ET AL     2,976,223
RECOVERY OF BUTADIENE MONOXIDE BY EXTRACTIVE DISTILLATION
Filed June 4, 1957
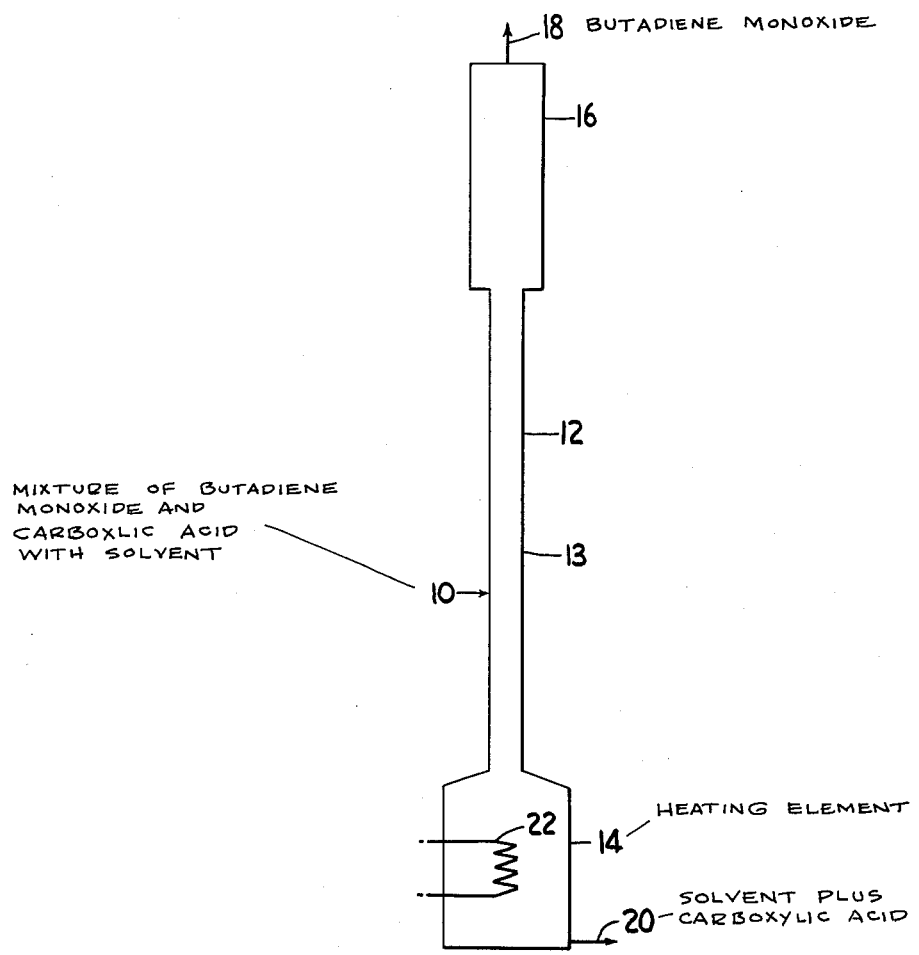
INVENTORS
MALCOLM KORACH &
WALKER H. RIDEOUT
BY
Oscar L. Spencer
ATTORNEY United States Patent Office 2,976,223
Patented Mar. 21, 1961

2,976,223

RECOVERY OF BUTADIENE MONOXIDE BY EXTRACTIVE DISTILLATION

Malcolm Korach and Walker Henry Rideout, Corpus Christi, Tex., assignors to Columbia-Southern Chemical Corporation, Allegheny County, Pa., a corporation of Delaware Filed June 4, 1957, Ser. No. 663,392

10 Claims. (Cl. 202—39.5)

This invention relates to a novel method of recovering butadiene monoxide. Applicants have found that butadiene monoxide may be prepared by reaction of a percarboxylic acid with butadiene. The reaction results also in the production of the corresponding carboxylic acid. For example, when peracetic acid is reacted with butadiene, butadiene monoxide and acetic acid are formed. The problem of separating acetic acid or like carboxylic acid (particularly the lower carboxylic acids containing up to 4 carbon atoms) from butadiene monoxide is complicated by the fact that the acetic acid tends to react with the butadiene monoxide and thereby to reduce the yield of butadiene monoxide isolated.

According to the present invention, it has been found that the yield of butadiene monoxide may be substantially improved and an effective separation of butadiene monoxide from a carboxylic acid, such as acetic acid, may be achieved by passing a vapor comprising an inert organic solvent having a boiling point between the boiling point of the carboxylic acid and the butadiene monoxide, in contact with or through the liquid butadiene monoxide-carboxylic acid mixture and thereby forming a vapor mixture of butadiene monoxide and solvent which is then removed from the liquid. This process may be accomplished most effectively by introducing the liquid mixture of butadiene monoxide and carboxylic acid into the intermediate portion of a column above the bottom and below the top thereof. The solvent is vaporized in the lower portion of the column or at the bottom thereof and the solvent vapor is caused to flow upwardly through the column and generally some portion or all of the solvent is condensed in the upper portion. Butadiene monoxide is caused to vaporize, by passage of the solvent vapor in contact with the liquid mixture, thus forming a vapor mixture of the butadiene monoxide and the solvent. Solvent refluxing in the upper portion of the column strips any acetic acid vapor from the butadiene monoxide vapor which passes from the upper portion of the column. In this case, acetic acid or like carboxylic acid tends to concentrate in the lower portion of the column and may be withdrawn along with solvent. Usually some portion of solvent also tends to vaporize with the butadiene monoxide and is removed therewith. The column may be a packed or bubble plate column having a plurality of actual or theoretical plates, usually in excess of 5 plates. The butadiene monoxide-carboxylic acid mixture is introduced into the column above the bottom and below the top thereof.

It will be understood that a pair or a plurality of columns may be arranged in series introducing the butadiene monoxide-carboxylic acid mixture into the system between columns. The term "stream of refluxing inert solvent" as herein used includes the use of one column or several columns in sequence.

An especially valuable group of solvents which can be used for the purpose are the chlorinated hydrocarbons having the boiling point desired. Typical of these are ethylene dichloride, carbon tetrachloride, trichloroethylene, and 1-chloro-2-methyl butane. Other solvents, such as benzene and toluene, may be used.

The solvent should at all events be inert to the butadiene monoxide and the acetic acid. Also, it should be capable of dissolving an appreciable concentration of butadiene monoxide.

According to a further embodiment of the invention, it has been found that butadiene monoxide can be effectively produced by reaction of butadiene with a percarboxylic acid, such as peracetic acid, in the presence of a water immiscible solvent for the butadiene monoxide, preferably one of the solvents mentioned above which has a boiling point intermediate the boiling point of the butadiene monoxide to be produced and the carboxylic acid which is evolved. This reaction can be conveniently conducted producing substantial yields of butadiene monoxide at a temperature of 20 to 100° C. The presence of the water immiscible solvent tends to minimize the tendency of the evolved acetic acid or like carboxylic acid to react with the evolved butadiene monoxide. Any water which is present in the percarboxylic acid tends to be expelled from the organic solution due to its immiscibility with the solvent and carrying with it some concentration of the acetic acid or like carboxylic acid. Solvents listed above as well as other solvents which are immiscible with water (i.e., those which dissolve less than 10 grams of $H_2O$ per liter of solvent) may be used. Typical examples of such solvents are chloroform, orthodichlorobenzene, diethyl ether, methyl chloride, methylene chloride, etc.

Various percarboxylic acids may be used for this purpose. Of particular value is peracetic acid. However, perpelargonic and other peracids, such as trichloroperacetic acid, trifluoroperacetic acid, perpropionic acid and the like may be used. In addition, the reaction may be conducted reacting butadiene in the solvent with acetaldehyde monoperacetate, propionaldehyde monoperacetate or like peracylate such as described in British Patent No. 735,974.

The reaction product thus obtained comprises the butadiene monoxide, solvent if present, and the carboxylic acid (acetic acid or the like).

The accompanying drawing diagrammatically illustrates the practice of the process of separating butadiene monoxide from a mixture thereof with carboxylic acid such as is produced as described above. The apparatus diagrammatically illustrated comprises a column 12 provided with a heating section 14 equipped with a heating element 22, an intermediate section in the form of a packed section 13 or a plurality of bubble plates and a condensing section 16.

The intermediate section preferably should provide at least 5 plates or theoretical plates.

In the practice of the process solvent either as such or mixed with butadiene monoxide and/or carboxylic acid is placed in the heating section 14 and vaporized to such an extent that the vapors flow up the column well above the intermediate point 10 and usually as high as the condensing section 16 or even through exit 18.

A liquid mixture of butadiene monoxide and carboxylic acid, such as acetic acid with or without solvent is introduced into the column at the intermediate point or points 10. In consequence, the solvent vapors contact the liquid as it flows down the column from intermediate point 10 and removes butadiene monoxide therefrom. The acetic acid or like carboxylic acid collects together with solvent in the heating section and is withdrawn through line 20.

The vapor mixture of butadiene monoxide and solvent passes upward in the column above the intermediate point 10 and is scrubbed with solvent which has been condensed and flows downward in the column. This liquid solvent removes acetic acid which is entrained or is in vapor state from the vapors. As the vapor mixture passes upward, a portion of the solvent condenses and flows down the column. Butadiene monoxide vapor usually mixed with some solvent is removed through line 18 above condenser 16.

The following is a typical example:

*Example I*

50.0 grams of butadiene-1,3 was dissolved in 500 milliliters of ethylene dichloride, placed in a flask, and 142.8 grams of peracetic acid solution containing 40 percent by weight of peracetic acid was added to the ethylene dichloride solution. Prior to addition, the peracetic acid solution had been treated with 4.81 grams of sodium acetate to neutralize sulphuric acid which was present. After the acid had been added, the mixture was allowed to stand for about 2.75 hours. During the entire period of the reaction, the temperature was maintained at 40° C. Analysis indicated that about 100 percent of the butadiene had been converted to butadiene monoxide. A one-inch Oldershaw bubble plate column having 35 plates was used in the distillation, as diagrammatically illustrated in the drawing, and ethylene dichloride was vaporized in the lower portion of the column and in heating section 14. The major portion of the vaporized ethylene chloride was condensed in the condenser 16 and the portion of the column above inlet 10 and flowed down the column.

The butadiene monoxide-acetic acid-ethylene dichloride solution was fed into the refluxing ethylene dichloride through inlet 10, 10 plates above the bottom of the column. The solution fed to the column weighed 707 grams and contained 47.8 grams of butadiene monoxide and 80.6 grams of acetic acid. The feed rate of the solution was 6 milliliters per minute. The pressure maintained within the column was 65 millimeters of mercury. Butadiene monoxide was vaporized and a mixture of butadiene monoxide vapor and ethylene dichloride vapor rose above inlet 10 in countercurrent contact with refluxing liquid ethylene dichloride flowing down the column. The distillate withdrawn from the top of the column contained only a very minor concentration of acetic acid. Likewise, the acetic acid which collected in a pot at the bottom of the column contained only a trace of butadiene monoxide. The temperature of the liquid in the pot at the bottom of the column was maintained at about 43 to 36° C. The temperature of the vapors escaping from the top of the column was maintained at 16 to 19° C. During the operation, the volume ratio of liquid condensed and refluxed down the column to distillate removed from the column through outlet 18 was 5 to 1.

The above is a typical example of the manner in which the process herein contemplated can be carried out. The process functions equally well using other solvents listed above in lieu of ethylene dichloride. In like manner, the process can be performed using other percarboxylic acids in lieu of peracetic acid.

*Example II*

The process of Example I is repeated using an equivalent amount of perpelargonic acid in lieu of peracetic acid.

*Example III*

Two hundred grams of butadiene is dissolved in 500 milliliters of ethylene dichloride and the solution was placed in a closed pressure reactor containing 100 grams of acetaldehyde monoperacylate and 100 grams of acetaldehyde. The mixture is maintained at 15° C. under the pressure of the system for 24 hours. The resulting mixture is treated to recover butadiene monoxide as in Example I.

Similar results are attained using propylene dichloride, or when using perpelargonic acid in lieu of peracetic acid.

Although the present invention has been described with reference to specific details of certain embodiments, it is not intended that such details shall be regarded as limitations upon the scope of the invention except insofar as included in the accompanying claims.

What is claimed:

1. A method of separating butadiene monoxide from acetic acid which comprises passing vapors of an organic solvent, which is inert to butadiene monoxide and acetic acid and which is capable of dissolving an appreciable concentration of butadiene monoxide, having a boiling point between the boiling points of acetic acid and the butadiene monoxide in contact with a liquid mixture of the butadiene monoxide and the acetic acid thereby forming a vapor mixture of butadiene monoxide and said solvent and recovering said vapor mixture from said liquid mixture.

2. A method of separating butadiene monoxide from carboxylic acid which comprises passing vapors of an organic solvent which is inert to butadiene monoxide and the carboxylic acid and is capable of dissolving an appreciable concentration of butadiene monoxide, said solvent having a boiling point between the boiling points of carboxylic acid and the butadiene monoxide in contact with a liquid mixture of the butadiene monoxide and the carboxylic acid thereby forming a vapor mixture of butadiene monoxide and said solvent and recovering said vapor mixture from said liquid mixture.

3. The process of claim 2 wherein the carboxylic acid is a lower carboxylic acid containing up to 4 carbon atoms.

4. A method of recovering butadiene monoxide from a mixture of butadiene monoxide and carboxylic acid which comprises establishing a stream of refluxing organic solvent which is inert to butadiene monoxide and the carboxylic acid and is capable of dissolving an appreciable concentration of butadiene monoxide, said organic solvent having a boiling point between the boiling points of carboxylic acid and butadiene monoxide, introducing the mixture into an intermediate portion of the stream above the bottom and below the top thereof, vaporizing the butadiene monoxide, withdrawing butadiene monoxide in vapor state from the one end of the stream, and recovering carboxylic acid from the other end of the stream.

5. The process of claim 4 wherein the solvent is a hydrocarbon chloride.

6. A method of recovering butadiene monoxide from a mixture of butadiene monoxide and acetic acid which comprises establishing a column of refluxing organic solvent which is inert to butadiene monoxide and the carboxylic acid and is capable of dissolving an appreciable concentration of butadiene monoxide, said organic solvent having a boiling point between the boiling points of acetic acid and butadiene monoxide, introducing the mixture into an intermediate portion of the column above the bottom and below the top thereof, vaporizing the butadiene monoxide, withdrawing butadiene monoxide in vapor state from the upper portion of the column, and recovering acetic acid from the lower portion of the column.

7. The process according to claim 6 wherein the solvent is a hydrocarbon chloride.

8. The process according to claim 6 wherein the solvent is ethylene dichloride.

9. The process according to claim 6 wherein the solvent is carbon tetrachloride.

10. The process of claim 6 wherein the solvent is trichloroethylene.

References Cited in the file of this patent

UNITED STATES PATENTS

| | | |
|---|---|---|
| 1,892,770 | Jaeger | Jan. 3, 1933 |
| 2,231,241 | Bailey | Feb. 11, 1941 |
| 2,388,160 | Krase | Oct. 30, 1945 |
| 2,434,923 | Nachmuth | Jan. 27, 1948 |
| 2,457,328 | Swern et al. | Dec. 28, 1948 |
| 2,458,484 | Terry et al. | Jan. 4, 1949 |
| 2,652,439 | Neuhart et al. | Sept. 15, 1953 |
| 2,780,588 | Dunlop | Feb. 5, 1957 |

FOREIGN PATENTS

| | | |
|---|---|---|
| 692,755 | Great Britain | June 10, 1953 |

OTHER REFERENCES

Swern: Chemical Reviews, vol. 45, August 1949, pages 16 to 25.

Robinson et al.: "Elements of Fractional Distillation," 4th ed., McGraw-Hill, New York (1950), pages 115–116 and 261–265.